United States Patent [19]

Rasmussen

[11] 4,021,082

[45] May 3, 1977

[54] REPLACEMENT GROUSER BAR AND METHOD FOR MANUFACTURING THE SAME

[76] Inventor: Robert Rasmussen, 28511 Vista Tierra, San Pedro, Calif. 90732

[22] Filed: Apr. 2, 1975

[21] Appl. No.: 564,535

[52] U.S. Cl. ............................................. 305/54
[51] Int. Cl.² ...................................... B62D 55/28
[58] Field of Search ................... 305/54, 53, 56; 29/148.3; 148/145, 146

[56] References Cited

UNITED STATES PATENTS

| | | | |
|---|---|---|---|
| 1,822,132 | 9/1931 | Davis | 305/54 |
| 1,952,545 | 3/1934 | Gotshall | 305/54 |
| 2,039,012 | 4/1936 | Lindberg | 305/54 |

*Primary Examiner*—Philip Goodman
*Attorney, Agent, or Firm*—Lowell G. Turner

[57] ABSTRACT

A grouser bar and its manufacturing method, the bar being adapted for attachment to worn tractor pads. The bar is hardened on one of its edges and its ends for wear resistance and is relatively soft for weldability at the opposite edge. The ends are thickened in relation to the balance of the bar and regions of curvature are provided at the ends of the bar for matching the worn shape of the old bar.

15 Claims, 9 Drawing Figures

REPLACEMENT GROUSER BAR AND METHOD FOR MANUFACTURING THE SAME

BACKGROUND OF THE INVENTION

Grouser shoes are attached to interconnected links making up the flexible track of a vehicle such as a crawler tractor or the like. The shoes provide the tractor with both floation and traction. Since a tractor usually utilizes 62 to 86 grouser shoes, and since these shoes are subjected to rapid wear, the cost of grouser shoe replacement is very significant.

Each grouser shoe includes a relatively flat pad area having means for attaching it to a track chain or rail assembly upon the vehicle, thereby facilitating a controlled relative movement between adjacent pads. The primary purpose of the pad area is to provide floation.

A bar is affixed to one surface of the pad either as an integral part thereof or as a component manufactured separately and welded to the pad. It extends outward from the surface, its length being disposed across the width of the pad such that during tractor operation the bar is forced against or into the earth being traversed. The bar is the first portion of the shoe subjected to serious wear, particularly when the equipment is operating in hard or rocky terrain. Since grouser shoes are extremely expensive, it is the normal and desirable practice to replace worn bars by welding new bars to the pads, thereby increasing the shoe life.

Weldable grouser bars and similar parts have been manufactured and used in the past. However, they have usually been of a substantially uniform hardness over their entire widths and of uniform cross-sectional configuration over their entire lengths such as shown in U.S. Pat. Nos. 1,952,545 and 3,307,882, for example. Configurations such as these have been difficult to adapt to worn surfaces in view of the fact that standard grouser bars wear with a distinctive, but relatively predictable curvation across their central region. There is also a marked increase in wear over the last few inches adjacent to the ends since this region is subjected to maximum abrasion in turns and the like. The greatest part of the central region, being of a thickness and hardness fairly uniform with the rest of the bar, is a typically relatively flat, although angled, with a rapidly "dubbed-off" corner. Hence, when repaired with a standard replacement bar, a great amount of filler weldment is required to close the gaps between the worn bar and the replacement bar. Additionally, while it is recognized that tip hardening has been accomplished in original, integral construction, as shown in U.S. Pat. Nos. 1,602,199 and 2,549,930, the requirement to obtain weldability in replacement bars has generally resulted in a compromise in wear characteristics, since softness for weldability and hardness for maximum wear have heretofore basically been features of incompatibility in a single replacement bar. Additionally, other than by, perhaps, providing a cast and forged bar, there has been no adequate method to obtain replacement grouser bar with thickened ends for maximizing wear in such vulnerable regions. More particularly, there has been no means for obtaining such results when starting from flat stock, as in the present invention.

SUMMARY OF THE INVENTION

The present invention overcomes the problems of the prior art by providing a method for obtaining a combination of features in a replacement grouser bar which is fabricated, as by flame-cutting from a blank and formed by a forging operation, shaping the end regions to include extra material. It is then differentially hardened such that one edge substantially matches the hardness of the worn bar for weldability. The opposite edge and the ends, in the regions subjected to conditions causing the greatest wear, are hardened to optimize their wear characteristics and crack resistance. The bar is also quench-drawn in conjunction with the swaging operation to substantially match the curvature of the worn bar, thereby minimizing the quantity and difficulty of the weldment required for its installation to the worn grouser bar.

DETAILED DESCRIPTION OF THE INVENTION

Figure 1:
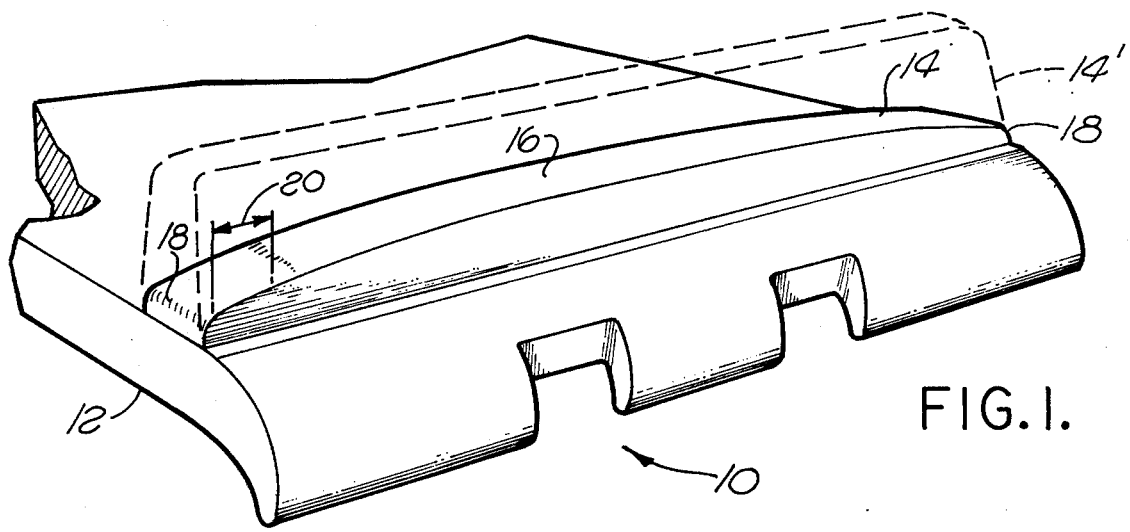
FIG. 1 is a perspective view of a worn grouser shoe partially cut away to illustrate a typical grouser bar wear pattern.

FIG. 1 is illustrative of a typical grouser shoe 10 wherein the grouser bar has been worn to a substantially unusable condition. This shoe includes a plate 12 and a grouser bar 14 extending from and disposed across the width of the plate. Natural wear of the bar 14, so illustrated, has resulted in substantially the shape shown, worn down from an original shape approximating that indicated by the dashed lines 14. It will be understood, however, that this worn shape sometimes varies to a limited extent, dependent upon the specific design of the original unit and the operational environment of the equipment.

As seen in FIG. 1, the central region 16 of the worn bar 14 has assumed a somewhat curved contour, while the end sections have worn to a much greater extent, the corners 18 having become distinctly rounded. It is usual that there is a region somewhat flattened, or of lesser curvature than the ends or the central portion, adjacent the corners 18, in the general regions indicated by arrows 20. This is a natural and fairly typically encountered wear contour, although, as previously stated, the specific contour sometimes varies in view of the characteristics of the terrain over which the vehicle operates. It is the generalized contour described which the replacement grouser bar of this invention is designed to best match.

This invention is directed to both the method of fabricating a replacement grouser bar and the finally fabricated product.

Figure 3:
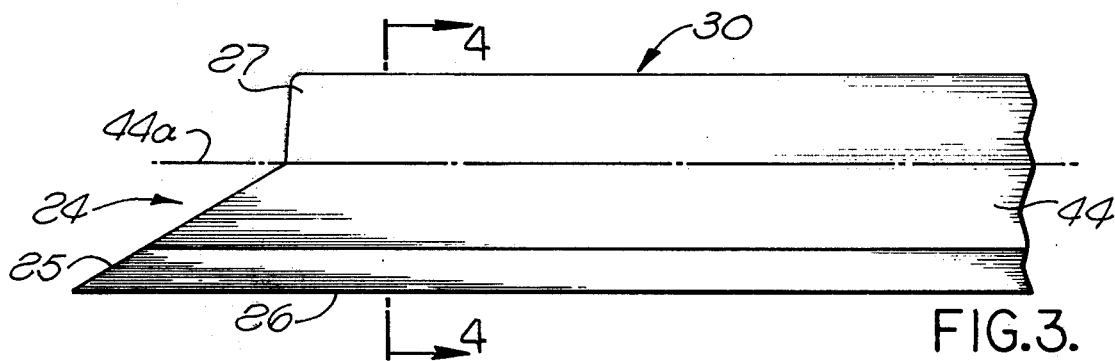
FIG. 3 is a partial side view of the grouser bar cut to its pre-forged shape.
Figure 2:
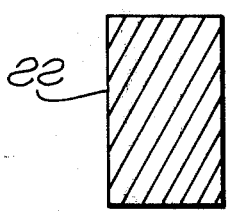
FIG. 2 is a cross-section of a typical blank from which the grouser shoe is fabricated.
Figure 5:
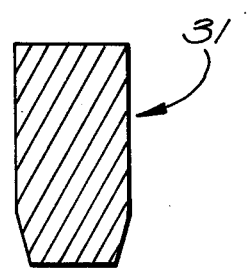
FIG. 5 is an alternate embodiment, taken from the same place as is FIG. 4.
Figure 4:
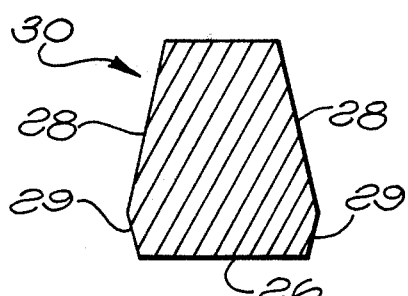
FIG. 4 is a cross-sectional view taken along line 4—4 of FIG. 3.

The basic blank 22 from which the finished product is produced is of the general cross-sectional configuration illustrated in FIG. 2. It is prepared, for example, from a piece of rolled steel such as 10B55, C-1055, 4130, 8630, 8730 or 8742 steel, or other steels having a carbon range of 30 to 70 with variations in the amount of manganese or chrome, and with boron, added, and cut, as by flame cutting, from a standard flat plate, or from bar stock of predetermined thickness, to the proper length and width. The blank 22, so prepared, is then cut, again by flame cutting, or the like, to provide the ends 24, usually scarfed at a double angle, with lower region 25 approximating 45° from the base 26 and the upper region 27 approximating 60° from the base 26. The sides are shaped from the basic rectangular cross-sectional shape shown in FIG. 2 to the shape illustrated in FIG. 3 or 4 wherein the sides are beveled, as at 28 and 29, or to any other roughly comparable desired shape, to define an intermediate bar 30 or 31 (FIGS. 3–5). Again, this cutting and trimming may be accomplished by a conventional acetylene cutting torch or any other acceptable shaping means. It is also sometimes desirable that rolled bar stock be obtained with the bevel at sides 28 and 29 rolled into the bar, thereby reducing fabrication costs.

The bevels shown in the cross-sectional views of FIGS. 4 and 5 are representative only of various configurations which can be utilized. In general, however, a section substantially as shown in FIG. 4 has been found to be most acceptable.

It is of significance to the commercial success of this invention that a relatively inexpensive raw material, such as the aforementioned rolled steel, and a similarly inexpensive trimming or rolling technique can be utilized in these initial processing steps.

Figure 6:
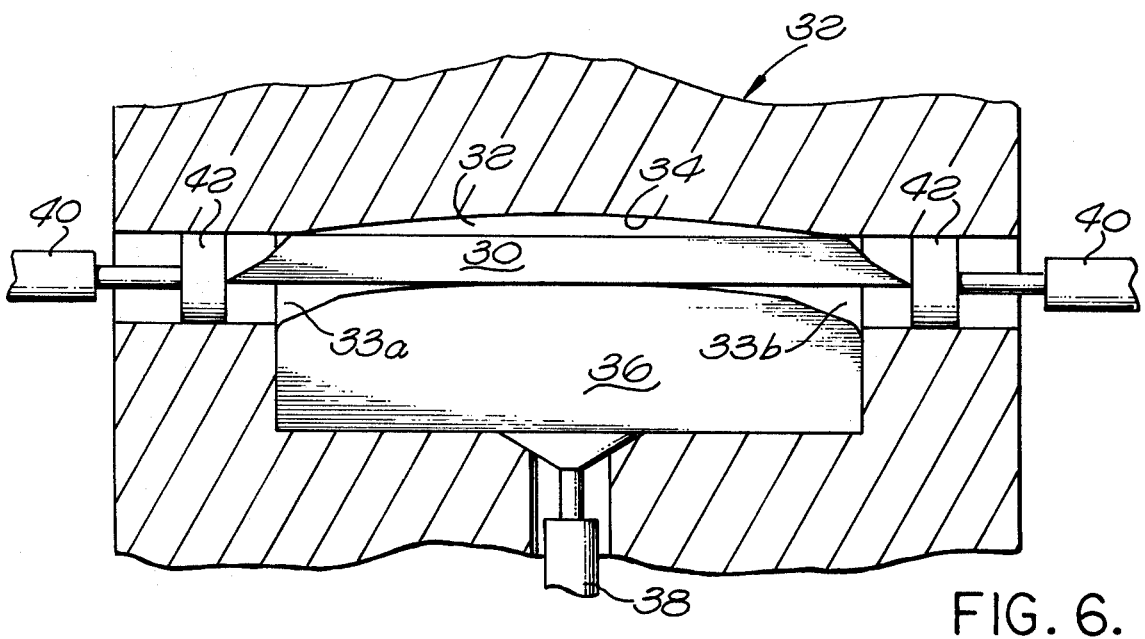
FIG. 6 is a view of a forging fixture having a grouser bar blank positioned therein preparatory to forming.

The properly shaped intermediate bar 30 and 31 is next heated until it is within the range of approximately 1650° to 2000° F. for forging. The heated bar is then placed in a special forming fixture such as the hydraulically actuated device 32 shown in FIG. 6, which device is not a part of this invention.

The forming fixture utilizes in its operation a three cylinder forming principle. The intermediate grouser bar 30 is placed in a forming cavity 33 in the fixture and secured by appropriate holding means (not shown). The cavity 33 has one stationary surface 34 which is usually substantially straight, but which is sometimes contoured to an alternative shape which one edge of the bar is intended to retain. The opposite side 36 of the cavity is movable and, again, sometimes curved to substantially the desired contour for one edge of the bar, the final curvature, however, usually being imparted during the quenching operation. In any event, sufficient curvature is provided adjacent the ends of the cavity to permit appropriate curvature of the bar ends. Force applied to the moveable side 366 by a hydraulic ram 38 while the intermediate bar 30 is in its heated condition retains the blank and bends it into shape wherein the noted contours of the cavity 33 are assumed. When no curvature is to be introduced, the cavity side 34 and the movable side 36 are straight, acting simply as a retaining means for the succeeding forging operation.

The forming fixture also includes two opposing hydraulic cylinders 40 at its opposite ends, disposed to counteract one another. These cylinders are connected by a pressure-equalizing valve (not shown) to guarantee that each will apply a force of same magnitude to the end of the intermediate bar 30. Each of the cylinders 40 supports a movable anvil 42 of the shape ultimately desired for the ends of the grouser bar.

Upon occasion when the forging operation is not used, the temperature of the applied heat can be reduced to as low as 1450° F.

Figure 8:
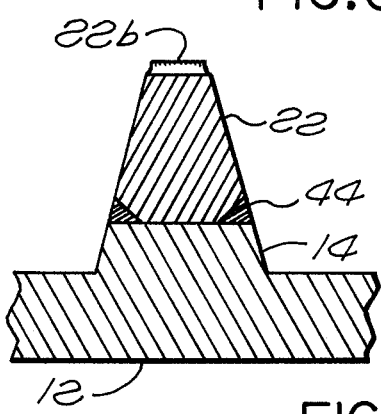
FIG. 8 is a sectional view taken along line 8—8 of FIG. 7.

After the intermediate bar 30 has been secured and shaped by the action of the movable side 36 of the fixture, the cylinders 40 are actuated such that they apply great compressive forces against the respective ends of the partially formed bar 30. This causes the extremities of the heated blank ends to be formed downward into the shapes defined by the anvils and to assume any contours defined in the movable side 36, thereby generally conforming the new bar ends 42 (FIG. 7) to shapes matching those of the worn grouser bar ends. This step, which is sometimes referred to as a forging operation, also causes the ends of the intermediate bar 30 to be thickened, substantially as shown in FIG. 8. Space appropriate to the specific shape desired is provided in the fixture cavity region 33a and 33b to accommodate such thickening. The bar ends 42 are thereby provided with extra material for abrasion resistance during functional operation of the vehicle to which the grouser shoes are affixed. End tongs 44 may be defined in any lengths desirable to fit worn grouser bars which may have been subjected to extreme end corner wear.

This partially formed bar is removed from the forming fixture while still hot. It is placed in a special quenching fixture (not shown) which covers that amount of the grouser bar which is to be maintained in a relatively soft condition. Usually at least one half of a lower or attachment portion 44 of the partially worked intermediate bar 30, generally below the phantomed line 44a in FIG. 3 is so maintained, the upper portion being further hardened. It has also been found desirable to harden the ends 42 for reasons to be described. Therefore, in my usual practice of the invention, the two end regions c in FIG. 7, remain exposed (not covered by quenching fixture). The main portion of the bar covered by the fixture may vary from approximately 30° to 70° of the bar height, a greater portion being covered in the central region than toward the ends, dependent upon the degree of hardness desired and the desirability of hardening greater or lesser portions of the bar. The exposed portion of the bar is then quenched with a high volume of water sprayed thereupon at ambient temperature, by submergence in water at ambient temperature, or by submergence in a salt bath in accordance with conventional quenching practice. This procedure results in a quench cooling and hardening of the entire bar, but with the uncovered portion being cooled fastest and hardened to the greatest extent. The bar is thereby progressively or differentially increased in hardness from the covered portion to the uncovered portion, the hardening being progressively greater as the uncovered portion increases. The quench is timed to gain the proper hardness and Martensitic structure of the steel. Total control is maintained by covering and quenching procedures such that the central and attachment region, indicated by the letter A in FIG. 7, as separated by the dashed lines, attains a Rockwell C hardness within the range of 35 and 50 with an optimum hardness approximating 41. Simultaneously the opposite edge, in the region indicated by the letter B, has a Rockwell C hardness range of between 29 and 40, with an optimum hardness approximating 32, and the end regions, indicated by the letters C, have a Rockwell C hardness within the range of 45 and 60 with an optimum hardness of about 50. It will be noted that the entire length of the weldable edge.

The described fabrication method, with the resulting differential hardness along the bar length, gives the bar a lengthwise flexibility and provides the aforementioned beam strength. The ultimate result is a significantly improved resistance to breaking, such as often occurs in conventionally fabricated grousers, particularly while operating in rocks. In the latter instances it is usual for cracks to develop in the central half of the grouser bar, propogating through the bar, its weldment, to the pad and into the pad proper. In such instance the bar and the pad often break in two, resulting in very costly damage. The noted beam strengthening has been found to be highly effective in combatting such tendencies.

The quench is stopped while the attachment or softest portion of the bar is still hot, the temperature of that portion then approximating 550° F. to 650° F. This portion is then permitted to cool slowly, causing it to contract and arch, to greater extent, assuming a curvature (as at 46a in FIG. 7) approximating that of the worn grouser bar 14, to which it is to be ultimately welded. The amount of ultimate arch in the bar is controlled by the extent of the curvature imparted by the forming fixture and the quench time and depth. In a typical sample, a bar approximately 24 inches in length, 2 inches in height and ¾ inch thick was heated to 1800° F. About 60% of the bar height was covered at its central region and the remaining 40%, plus the entire end regions, were subjected to a water spray quenching bath at ambient temperature. A total curvature of about ⅛ inch to 3/16 inch in height was induced in the bar. It is usually desirable that the 90° center area of the bar at the surface 46b include a curvature approximating that of the worn bar to which it is to be welded. The bar, in its final shape, is identified by the numeral 46 in FIG. 7.

During the above-described cooling and curvature-inducing procedure, a part of the residual heat in the region remaining hot is transmitted by conduction to the cooled portion which has now been hardened to the greatest extent. This results in a draw of the hardened area, controlled by the timing of the quench and depth of quench hardness. The draw temperature, as indicated above, is between 550° F. and 850° F., the temperature being tested by a temple stick (a waxy material which melts at a predetermined temperature) or by other appropriate means. Hence, the controlled quenching operation results directly in a triple function, (1) differentially hardening, (2) curvature of the bar, and (3) drawing for hardness and associated material stress control. This understandably contributes materially to the ability to obtain a finalized part at an exceptionally economical cost. The resulting heat-treated bar, with a hardened outer surface and ends also results in a grouser bar with a superior beam strength.

Should it be required, the bar may be straightened to any extent necessary while in its semi-heated condition.

It is sometimes desirable for specific applications of the bar that they be fully hardened. In such event, the entire curvature is accomplished by bending in the fixture as described above. The entire bar is then subjected to the quench bath, thereby accomplishing a uniform hardening over the entire height of the bar.

Figure 7:
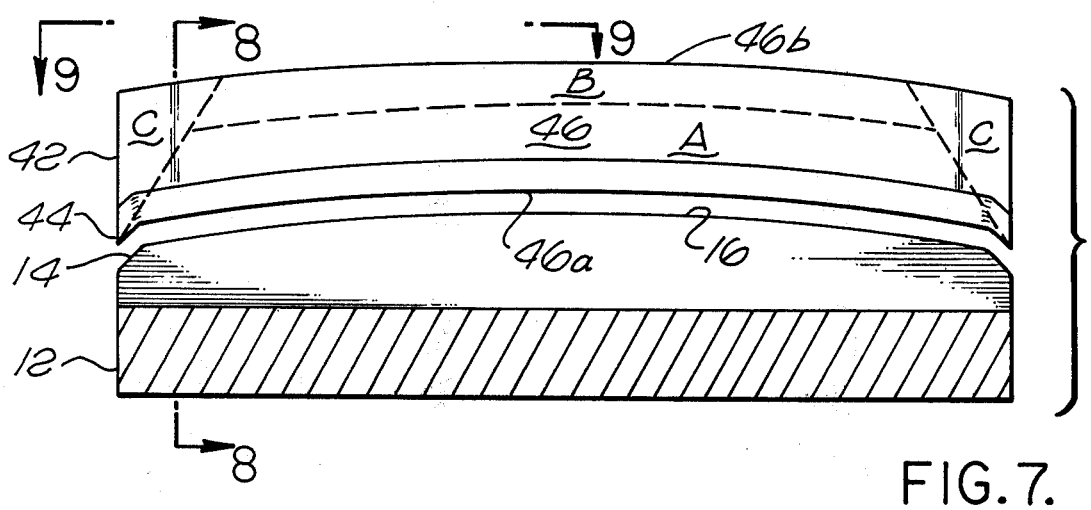
FIG. 7 is a side view of the bar, positioned over a grouser shoe having a worn bar, after the new bar has been forged and drawn into its final configuration.
Figure 9:
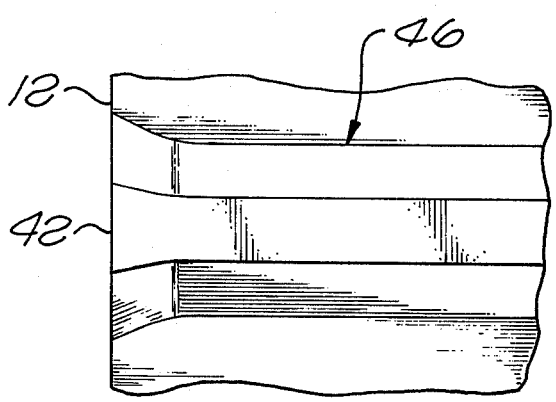
FIG. 9 is a top view of a bar end taken along line 9—9 of FIG. 7.

Bars fabricated in one piece and from relatively inexpensive flat stock in accordance with the procedural steps outlined herein may be effectively matched to the approximate contours of worn grouser bars, as illustrated in FIG. 7 and as previously stated. They include a high beam strength by virtue of their integral one piece construction, and their lengthwise differential hardening. They are then capable of being welded to the worn bar (FIG. 8) with a minimum of difficulty and cost. This is readily accommodated since (a) the necessity for trimming of worn bars to shape is eliminated, (b) bending the replacement bar to fit worn bars is no longer required, and (c) there are no large voids between the old and new bars, as a result of lack of contour conformity therebetween, which must be filled with weldment material. The unitary construction and the ability to utilize a minimum of weldment material also results in a structure of maximized strength; this in contrast to replacement grouser bars of the prior art which have proven to be structurally weak, having a low beam strength and being subject to cracking and breaking in service. This weakness has resulted inherently from multiple piece construction and the requirement to use an excessive amount of weldment material, such material being of a relatively brittle character and, therefore, structurally deficient when used in excessive quantities.

The differential hardness of the replacement bar of this invention also lends additional weldability and toughness to the structure, since the relatively low hardness of the attachment portion approximates that of the worn bar. A single pass weld is sufficient to effectively and efficiently accomplish this attachment, whereas the welding of a bar wherein the attachment portion is fully hardened requires a two or three pass weld at low temperature. This latter procedure, despite its complication and added cost, results in a weld which is structurally inferior to that of the present invention.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A replacement grouser bar for welding to a partially worn grouser bar comprising:
    an elongated unitary steel bar cut from stock material two edges upon said bar,
        one of said edges being contoured concavely to substantially conform to the contour of the worn grouser bar to which it is to be welded;
    ends upon said bar having thicknesses exceeding the thickness of the primary portion of said bar;
    said bar being differentially hardened such that the edge opposite said concavely contoured edge, said ends, and portions of said bar adjacent thereto, are harder than that portion of said bar adjacent said concavely contoured edge, and a central region of said opposite edge is softer than said ends.

2. The replacement grouser bar of claim 1 wherein: said ends include contours of more pronounced curvature than said concavely curved edge to better match the shape of the ends of the worn grouser bar.

3. The replacement grouser bar of claim 2 wherein: said edge opposite said concavely curved edge is curved convexly.

4. The replacement grouser bar of claim 2, wherein: said opposite edge includes a crown and the material at said concavely curved edge is of a hardness approximating that of the worn grouser bar to which it is to be welded.

5. The replacement grouser bar of claim 1, wherein: the material of said bar is carbon steel having a carbon range of from 30 to 70.

6. A method for fabricating a replacement grouser bar adapted for welding to a partially worn bar on a grouser shoe comprising the steps of:
preparing a blank of carbon steel to a desired elongated shape and cross-section;
heating said shaped blank;
operating upon said shaped and heated blank so as to cause extremities of the ends to be flattened and increased in thickness and a concave curvature to be induced in a weldment edge and a convex curvature to be induced in a work-contacting edge of the blank intermediate the ends;
subjecting the work-contacting edge and from 30% to 70% of the shaped, heated and forged blank adjacent thereto, and the extremities of the ends, to a quenching bath; and
cooling the quenched bar portions, thereby differentially hardening the bar along its length and width and causing the entire bar to be drawn by heat transference from the region not quenched.

7. The method for fabricating a replacement grouser bar according to claim 6 and wherein said shaped and heated blank is mechanically bent to a desired curvature.

8. The method for fabricating a replacement grouser bar according to claim 6 and wherein said quenching step induces the quenched edge of said bar to assume an ultimate convex shape.

9. The method for fabricating a replacement grouser bar according to claim 6 and wherein said quenching is accomplished by subjecting said 30% to 70% of the bar to a quenching bath selected from the group of quenches comprising water spray, submergence in a liquid, and a salt bath.

10. The method of claim 6 for fabricating a replacement grouser bar wherein:
the blank is selected in a rectangular cross-sectional configuration;
the rectangular blank is trimmed to the desired elongated shape;
said trimming including, tapering the sides from a point of maximum thickness intermediate the said edges to a lesser thickness at each of those edges, one of the edges being of greater thickness than the other, the thicker one of said edges being adapted for welding to a worn grouser bar; and scarfing the bar ends to provide points thereon adjacent the edge of greater thickness.

11. The method of claim 10 for fabricating a replacement grouser bar wherein:
the trimming operation is performed by a cutting torch.

12. The method of claim 7 for fabricating a replacement grouser bar wherein:
the blank is heated to a temperature within the range of 1650° F. to 2000° F. preliminary to the bending step.

13. The method of claim 6 for fabricating a replacement grouser bar wherein:
the temperature of the heated blank is reduced to within the range of approximately 550° F. to 850° F. in said quenching operation.

14. The method of claim 6 for fabricating a replacement grouser bar wherein:
the weldment edge is hardened to within the range of about 29 to 40 Rockwell C hardness;
the work-contacting edge is hardened to within the range of about 35 to 50 Rockwell C hardness; and
the ends are hardened to within the range of about 45 to 60 Rockwell C hardness.

15. The method of claim 6 for fabricating a replacement grouser bar wherein:
the weldment edge is hardened to about 32 Rockwell C hardness;
the work-contacting edge is hardened to about 41 Rockwell C hardness; and
the ends are hardened to about 5.0 Rockwell C hardness.

* * * * *